Nov. 20, 1928. Re. 17,142
E. E. CLEMENT
RADIO BROADCAST SELECTING AND DISTRIBUTING SYSTEM
Original Filed Feb. 29, 1924
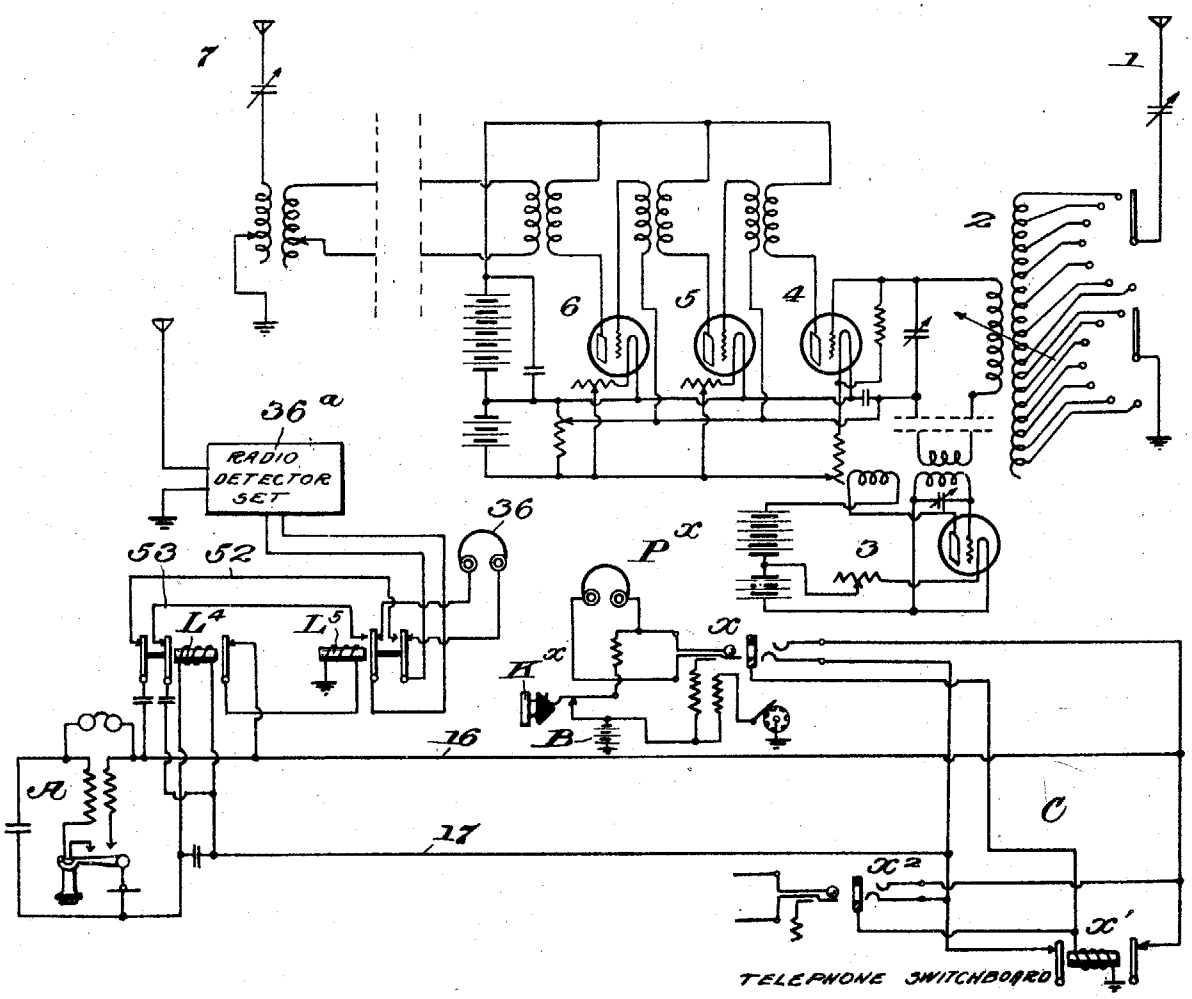
Inventor
Edward E. Clement Reissued Nov. 20, 1928. Re. 17,142

UNITED STATES PATENT OFFICE.

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA.

RADIO BROADCAST SELECTING AND DISTRIBUTING SYSTEM.

Original No. 1,522,361, dated January 6, 1925, Serial No. 696,076, filed February 29, 1924. Application for reissue filed January 5, 1927. Serial No. 159,249.

My invention relates to systems of radio broadcast distribution and is an improvement in the system described and claimed in my prior copending application, filed August 14, 1922, Serial No. 581,829 patented January 6, 1925, as Patent No. 1,522,357.

The present invention has for its object to provide improved centralized means for receiving from primary or distant stations and relaying the same modulations to subscribers in a local area, or in other words, an improvement in collecting and regional distribution. I attain my object by employing a superheterodyne receiving circuit, and retransmitting on the beat wave, for reception in the local area, this in combination with simultaneous supervision, control, metering, etc., of the service thus rendered, over wired circuits to the subscribers' stations, all as in the aforesaid prior copending application. At each subscriber's station I locate a receiving set which may be fed with direct current over the subscriber's wired line circuit, and said receiving set may be of any desired type, provided the construction and adjustment of all the subscribers' sets is standard and uniform, so that they are tuned once for all to the same wave length, being the beat wave length transmitted from the local central station relay transmitter.

My invention is illustrated in the accompanying drawing, in which the figure is a diagram showing a central station, a subscriber's station and the line circuit interconnecting them.

Referring to the drawing, C is a central station containing a telephone switchboard and a radio switchboard, each with connective apparatus and containing multiple line terminals for the subscriber's telephone line 16—17 which extends to the subscriber's station A, where a standard telephone instrument set is connected as shown. Tapped off from the wire 17 is a loop containing the windings of a relay $L^4$ shunted by a condenser. This relay controls the normal connection of wires 52 and 53 to the line wires 16—17, and also controls the normal connection of a companion relay $L^5$ to the line wire 16, which is the "tip" wire of the pair. The relay $L^5$ in turn controls output terminals of the radio detector set $36^a$, which are normally retracted so as to connect the set to the subscriber's receiving phone 36, which may be of any desired or suitable type. When the relay $L^5$ is energized, it disconnects the subscriber's phone 36, and connects his radio set across the line 16—17, so that the operator at the radio switchboard can listen in over the line and ascertain if the central office beat wave is in tune with and is being properly received by the subscriber's instrument $36^a$. The relay $L^5$ is controlled by the radio switchboard operator by means of the key $Kx$, connected to the plug circuit $Px$. When the plug of this circuit is inserted in the subscriber's jack at $x$, a busy tone test is put on the multiple or test thimble of the line on the telephone switchboard, battery B is connected to the cut-off relay $x'$, the operator's headset is bridged across the conductors 16—17, and finally key $Kx$ being closed, battery B throws current out on the tip side of the line 16 to energize relay $L^5$ and enable the operator to listen in on the subscriber's radio set. While I have shown the subscriber's receiving telephone cut off during this operation, it may remain connected, the cut-off being an additional feature which enables the central office to deprive the subscriber of all service in case of necessity. When the operator is satisfied, and desires to be disconnected from the line the key $Kx$ is opened, and if desired the plug is pulled from the jack at $x$, the parts then all assuming their normal position shown in the drawing when receiving may be continued at the subscriber's station in the ordinary way. Incoming telephone calls from the station A and answered outgoing calls resulting from telephone operators plugging in as at jack $x^2$, result in energizing relay $L^4$, which displaces relay $L^5$ and totally disconnects the radio detector set $36^a$ from the line 16—17, this condition being maintained as long as the line is in use for conversation.

Radio transmitter T comprises an antenna circuit 1, coupler 2, local oscillator circuit 3, the first detector 4, radio amplifying units 5 and 6, and a radiating circuit 7. Since the essential part of the heterodyning operation is in the elements 1, 2, 3, 4, it is to be understood that the arrangement of the amplifying and other stages between the first detector 4 and the radiating circuit 7 are subject to modification in accordance with good practice. The beat waves after being sufficiently amplified may be directly thrown upon the radiating circuit, or may be communicated through a modulator and oscillator circuit, by which increased energy may be imparted to the radiating beat frequency waves. In the first case energy may be communicated in sufficient quantity by the oscillator 3, the tubes 5 and 6 being essentially power tubes and operating on any desired voltage. In the second case the result will be the transmission of a doubly modulated carrier wave, and the subscriber's instrument 36[a] will then be provided with double demodulating means of any known or suitable type. In either case the beat wave is of standard frequency.

The important point in the present invention is this: to select different stations and receive from any distant station at any wave length or frequency, heterodyning by means of the local oscillator 3 with said incoming modulated waves, and by proper tuning of the oscillator circuit 3 always producing a standard beat wave to which the subscriber's instruments in the local area are permanently tuned. The first and most important ancillary feature is that already described, of listening in from the central station by the radio operator over the subscriber's telephone line or other wired circuit, so as to be able to properly adjust and tune the central office instrument to the subscriber's standard wave length.

I claim:

1. A broadcasting system comprising primary high power stations using different wave lengths, secondary stations having receiving radio sets tunable to the different primary wave lengths and also having relay transmitting apparatus controlled by the receiving sets and operating on a standard fixed wave length the same for all secondary transmitters, and subscribers' receiving radio stations grouped around each secondary transmitting station in its local area and tuned permanently to the fixed transmitting wave lengths thereof, the receiving radio sets at the secondary or relay stations each comprising a tuned circuit for receiving the primary modulated waves, and a local oscillator circuit tunable to furnish heterodyning waves such that modulated beat waves will always be produced and fed into the transmitting circuit at the standard local frequency.

2. A radio system of intercommunication having a plurality of standardized uniform receiving stations divided into groups, all said stations being tuned to one common frequency and of sensitiveness limited to the areas covered by their respective groups, a local transmitting station for each group working on said common wave length, and means for modulating the waves radiated from said transmitting stations as determined by primary stations using variable wave lengths, said means comprising a primary circuit tunable to the wave lengths of the primary stations, and a local oscillator circuit tunable to furnish heterodyning waves therefor, so as to always maintain the beat wave in the transmitting circuit at the common or standard wave length for the local group.

3. A broadcasting system comprising a primary station, a secondary distributing station, and a plurality of local receiving stations related to the secondary station and all in permanent tune therewith, means at said secondary station to receive broadcast waves from the primary station at its wave length, and to relay and redistribute the same in its own area at the standard wave length to which its receiving stations are tuned, and means also at said secondary station to determine when its transmitter is actually tuned to the fixed wave length of its receiving stations, said relaying means including a local oscillator tunable to furnish waves at heterodyning frequencies for the modulated waves received from the primary station or stations, with a constant beat frequency giving the standard wave length for local transmission.

4. The method of relaying messages from primary transmitting stations using various wave lengths to a plurality of receiving stations in a local area permanently tuned to a fixed wave length, which comprises receiving any one of the primary waves, changing the frequency of the received wave by amounts depending upon the particular wave received to produce a wave always the same and corresponding in wave length to that of the receiving stations, and transmitting the wave at the changed frequency to the receiving stations.

5. The method of distributing broadcast matter to a plurality of receiving stations permanently tuned to a fixed wave length which comprises, receiving broadcast matter on various wave lengths different from the fixed wave length of the receiving station, heterodyning the received wave with a second wave, adjusting the frequency of the second wave to produce a constant frequency beat wave corresponding in wave length to the fixed wave length of the receiving stations, and transmitting said beat wave to the receiving stations.

6. The method of distributing broadcast matter to a plurality of receiving stations permanently tuned to a fixed wave length which comprises, receiving broadcast matter on various wave lengths different from the fixed wave length of the receiving station, heterodyning the received wave with a second wave, adjusting the frequency of the second wave to produce a constant frequency beat wave corresponding in wave length to the fixed wave length of the receiving stations, and amplifying and radiating said beat wave to the receiving stations.

7. The method of distributing broadcast matter to a plurality of receiving stations permanently tuned to a fixed wave length which comprises, receiving broadcast matter on various wave lengths different from the fixed wave length of the receiving station, heterodyning the received wave with a second wave, adjusting the frequency of the second wave to produce a constant frequency beat wave corresponding in wave length to the fixed wave length of the receiving stations, amplifying and radiating said beat wave to the receiving stations, detecting the beat wave at the receiving stations, and returning detected current to the relay station to determine if the beat wave is properly adjusted in frequency.

8. The method of broadcast distribution which comprises primarily transmitting broadcast matter by radiation over a common area at different wave lengths, and relaying the broadcast matter in different local areas to a plurality of receiving stations in each local area at a frequency common to all the receiving stations, said relaying being accomplished by means of a heterodyning wave adjustable to beat any incoming wave and thereby to produce a constant frequency for transmission to said receiving stations.

9. The method of broadcast distribution which comprises receiving broadcast matter at each of a plurality of relay stations at any one of a plurality of different wave lengths and retransmitting the received broadcast matter from each such relay station to a plurality of receiving stations grouped about it in a local area on a frequency common to all the receiving stations of a group, said retransmitting being accomplished by means of a heterodyning wave adjusted to beat any of the various incoming waves and produce a constant frequency for transmission to said receiving stations.

10. The method of broadcasting intelligence which consists in radiating high power electromagnetic waves for long distances over a large area at different wave lengths, transforming energy so radiated to a plurality of separated points within the large area into low power electromagnetic waves of a definite fixed wave length the same for all the received waves at any one point, and reradiating said transformed waves over smaller areas within said large area, said reradiated waves being produced by means of a heterodyning wave adapted to beat any incoming wave and produce a constant frequency only for transmission to said receiving stations.

11. The method of broadcasting intelligence which consists in radiating high power electromagnetic waves from a plurality of primary stations by short wave carriers having an identifying energy characteristic for each primary station, receiving the energy so radiated at a secondary station for relay transmission to a group of receiving stations local to the secondary station, changing the received energy into low power carrier waves having an identifying energy characteristic the same for all of the receiving stations of a group and retransmitting the changed wave at low power over a small area including said group of stations, said change of energy being accomplished by means of a heterodyning wave adapted to beat any of the various incoming waves and to produce a constant frequency only for transmission to said receiving stations.

12. The method of broadcast distribution to a plurality of receiving stations in a given area tuned to a common fixed wave length which comprises primarily transmitting broadcast matter by radiation over said area at various different wave lengths, and relaying the broadcast matter to the said receiving stations by receiving waves at one of said wave lengths, heterodyning the received wave with a second wave, adjusting the frequency of the second wave until regardless of the frequency of the received wave, the beat wave always corresponds in wave length to the said common fixed wave length and transmitting said beat wave to the receiving stations.

In testimony whereof I hereunto affix my signature.

EDWARD E. CLEMENT.